(12) United States Patent  
Tanaka (10) Patent No.: US 7,532,559 B2  
(45) Date of Patent: May 12, 2009

(54) AUDIO PLAYER (75) Inventor: Shinsaku Tanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 637 days.

(21) Appl. No.: 11/392,204

(22) Filed: Mar. 29, 2006

(65) Prior Publication Data

US 2006/0233064 A1 Oct. 19, 2006

(30) Foreign Application Priority Data

Apr. 7, 2005 (JP) ............................. 2005-110662  
Dec. 21, 2005 (JP) ............................. 2005-368175

(51) Int. Cl.  
G11B 7/28 (2006.01)  
G11B 7/004 (2006.01)

(52) U.S. Cl. ...................... 369/84; 369/30.5; 369/30.19

(58) Field of Classification Search ............. 369/30.04, 369/30.05, 30.06, 30.07, 83, 84, 53.31, 30.19  
See application file for complete search history.

(56) References Cited

U.S. PATENT DOCUMENTS

| 4,899,326 | A | * | 2/1990 | Takeya et al. ............ 369/30.83 |
| 5,633,842 | A | * | 5/1997 | Nishida et al. ............. 369/30.2 |
| 5,638,346 | A | * | 6/1997 | Aramaki ................... 369/30.09 |
| 5,751,678 | A | * | 5/1998 | Tanaka ..................... 369/53.31 |
| 6,904,003 | B2 | * | 6/2005 | Miyashita et al. ........ 369/30.07 |
| 7,356,661 | B2 | * | 4/2008 | Nakashika ................. 711/166 |
| 7,443,770 | B2 | * | 10/2008 | Kato ....................... 369/30.05 |
| 2002/0101791 | A1 | | 8/2002 | Ito |
| 2005/0232590 | A1 | * | 10/2005 | Shimizu ....................... 386/69 |
| 2006/0044969 | A1 | * | 3/2006 | Kudo et al. .................. 369/84 |

FOREIGN PATENT DOCUMENTS

| JP | 06-342583 | | 12/1994 |
| JP | 08-007454 | | 1/1996 |
| JP | 09-153274 | | 6/1997 |
| JP | 2005-124010 | A | 4/2002 |
| JP | 2002-222585 | A | 8/2002 |
| JP | 2002-245716 | | 8/2002 |
| JP | 2003-242754 | | 8/2003 |
| JP | 2004-296083 | | 10/2004 |
| JP | 2004-296083 | A | 10/2004 |
| JP | 2005-129162 | A | 5/2005 |
| JP | 2005-287015 | | 10/2005 |

* cited by examiner

Primary Examiner—Thang V Tran  
(74) Attorney, Agent, or Firm—Ditthavong Mori & Steiner, P.C.

(57) ABSTRACT

An audio-player comprises a loading-unit, a memory, an operating-unit, a dubbing-unit, a playback-unit, and a display-unit. The loading-unit loads a disc. The memory has a plurality of data-memory-areas. The operating-unit has direct keys for selecting the specific data-memory-area in the plurality of data-memory-areas. The dubbing-unit dubs sound-data recorded on the disc with a proper disc identification number which the disc has, into the data-memory-area selected by the direct key. The playback-unit plays back the sound-data stored in the selected memory area. The display-unit has a quantity-display-area and a location-display-area. The quantity-display-area has a plurality of display parts. The quantity of memory used for storing the sound-data in each of the data-memory-areas is indicated in each of the display parts. The location where the sound-data is being played back from or is stored in the memory, is indicated in the location-display-area.

16 Claims, 8 Drawing Sheets

AUDIO PLAYER

BACKGROUND OF THE INVENTION

1. Field of the Invention

The present invention relates to an audio player with a virtual disc changing function, and in particular to an audio player that stores sound data recorded on a plurality of discs, and plays back the sound data stored in the audio player when the audio player is operated like a real disc changer.

2. Description of the Related Art

An audio player which stores sound data and which plays back the stored sound data is proposed.

Japanese unexamined patent publication (KOKAI) No. 2004-296083 discloses an audio player which plays back music data, recorded from original discs, recorded on another disc after being compressed in MP3 (MPEG 1 Audio Layer 3) format etc. The compressed music data recorded on the disc are stored in a hierarchical folder corresponding to an identification number of the original disc, and the track number of the original disc.

However, the concept of hierarchical folders is unfamiliar to a person inexperienced with computers. Accordingly, it is difficult for a person unfamiliar with computers to change a location of a folder for their listening pleasure.

Japanese unexamined patent publication (KOKAI) No. 2005-129162 discloses a recording apparatus which stores compressed music data on an MD (Mini Disc), after being recorded from original discs (CD). The compressed music data recorded on the MD are stored with an identification number corresponding to an identification number of the original disc, and track number of the original disc.

However, in this recording apparatus, the identification number is in an order corresponding to the loading of the original discs.

SUMMARY OF THE INVENTION

Therefore, an object of the present invention is to provide an audio player which specifies data memory areas in which sound data recorded on a disc, are stored.

According to the present invention, an audio player comprises a loading unit, a memory, an operating unit, a dubbing unit, a playback unit, a display unit, and a control unit.

The loading unit loads a disc.

The memory has a plurality of data memory areas.

The operating unit has direct keys for selecting the specific data memory area in the plurality of data memory areas.

The dubbing unit dubs sound data recorded on the disc with a proper disc identification number which the disc has, into the data memory area selected by the direct key.

The playback unit plays back the sound data stored in the selected memory area.

The display unit has a quantity display area and a location display area.

The control unit controls the loading unit, the dubbing unit, the memory, the playback unit, and the d display unit.

The quantity display area has a plurality of display parts.

The quantity of memory used for storing the sound data in each of the data memory areas is indicated in each of the display parts.

The location where the sound data is being played back from, or is stored in the memory, is indicated in the location display area.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
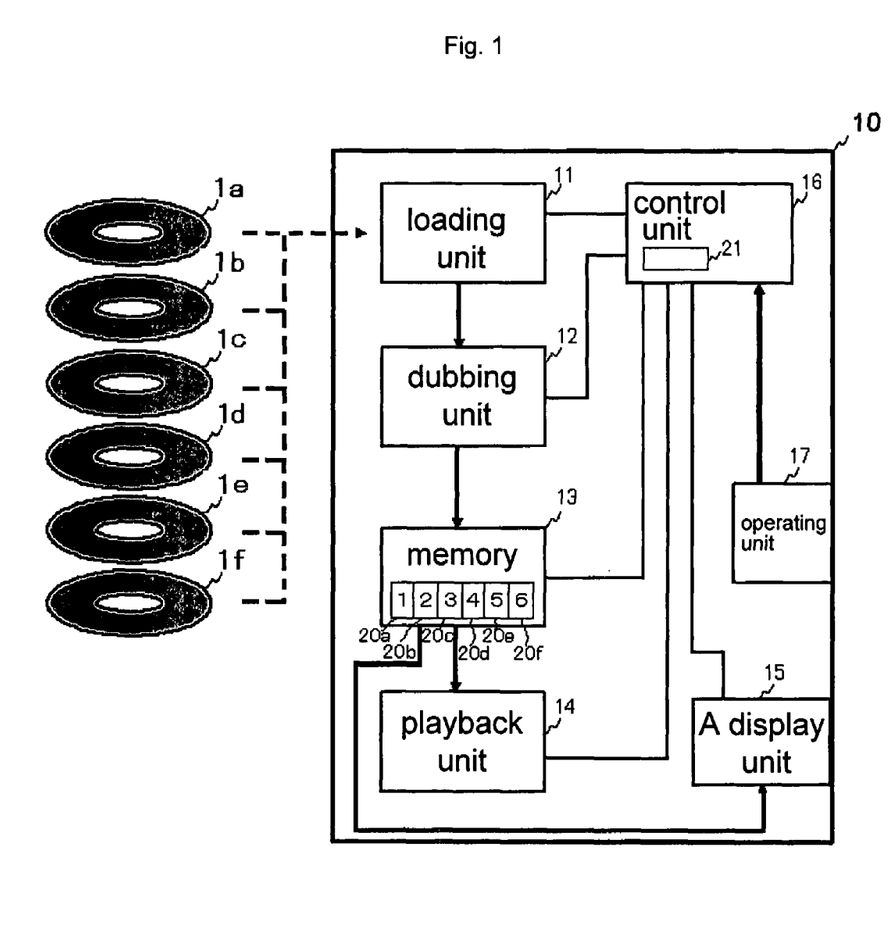
FIG. 1 is a construction diagram which shows an audio player with a virtual disc changing function in the first embodiment.

The present invention is described below with reference to the embodiments shown in the drawings. FIG. 1 is a construction diagram which shows an audio player with a virtual disc changing function. The virtual disc changer (a body 10) stores sound data and plays back the stored sound data, which are recorded on a first disc 1a, a second disc 1b, a third disc 1c, a fourth disc 1d, a fifth disc 1e, and a sixth disc 1f. The virtual disc changer can be operated like a real disc changer such as a CD changer etc. Accordingly, a user can select sound data stored in the virtual disc changer in the same way that the user selects the sound data recorded on the first, second, third, fourth, fifth, and sixth disc 1a, 1b, 1c, 1d, 1e, and 1f in a real disc changer.

In the first embodiment, the virtual disc changer stores the sound data which is recorded on the six discs, however, the number of discs may be another number (it is not limited to six).

The first disc 1a, the second disc 1b, the third disc 1c, the fourth disc 1d, the fifth disc 1e, and the sixth disc 1f are CDs (Compact Discs). The Compact Discs are music CDs (CD-DA; Compact Disc Digital Audio), CD-R (Compact Disc Recordable), and CD-RW (Compact Disc Rewritable) etc. The sound data is data in which music etc. is included. In the first embodiment, the sound data is music data, however the sound data may be another type of data, for example speech data etc. The six discs 1a, 1b, 1c, 1d, 1e, and 1f may be other disc mediums, for example MDs (Mini Discs).

The body 10 comprises a loading unit 11, a dubbing unit 12, a memory 13, a playback unit 14, a display unit 15, a control unit 16, and an operating unit 17. The display unit 15 and the operating unit 17 are arranged on a first front panel 18.

The first disc 1a, the second disc 1b, the third disc 1c, the fourth disc 1d, the fifth disc 1e, and the sixth disc 1f can be loaded into the loading unit 11 one by one. The dubbing unit 12 dubs sound data which is recorded on the loaded disc in the loading unit 11, into the memory 13, and compresses the data into MP3 (MPEG 1 Audio Layer 3) format etc. However, the dubbing operation may be performed without compressing.

Therefore, a lot of music data can be stored in the memory 13 due to the compressing operation.

Each of the first disc 1a, the second disc 1b, the third disc 1c, the fourth disc 1d, the fifth disc 1e, and the sixth disc 1f has a proper disc identification number. The sound data is zoned into tracks of the disc (each zone of sound data has a track number).

In the first embodiment, the sound data is music data. In the case where a plurality of music recordings is recorded on a disc, the music data for each music recording has a track number.

When the sound data is dubbed in the memory 13, the dubbing unit 12 dubs the track numbers and disc identification number which are recorded on the disc, based on the TOC (Table of Contents) information, in addition to the music data. The memory 13 stores the data which includes the music data, the track number, and the disc identification number.

The track numbers corresponding to the music data which are stored in the memory 13, are set to the same track numbers corresponding to the music data which are recorded on the first disc 1a, the second disc 1b, the third disc 1c, the fourth disc 1d, the fifth disc 1e, and the sixth disc 1f.

In the case where the first disc 1a, the second disc 1b, the third disc 1c, the fourth disc 1d, the fifth disc 1e, and the sixth disc 1f are MDs, the dubbing unit 12 dubs the sound data with track numbers and disc identification numbers based on the UTOC (User Table of Contents) information.

The memory 13 has a first data memory area 20a, a second data memory area 20b, a third data memory area 20c, a fourth data memory area 20d, a fifth data memory area 20e, and a sixth data memory area 20f.

A memory area of the dubbed data, including the music data, can be optionally selected from the first data memory area 20a, the second data memory area 20b, the third data memory area 20c, the fourth data memory area 20d, the fifth data memory area 20e, and the sixth data memory area 20f. When the memory area is optionally selected by the user, the music data recorded on the disc are stored in the selected memory area (20a or 20b or 20c or 20d or 20e or 20f), and the disc identification number is stored in the selected memory area.

In this way, the music data, recorded from the discs, can be stored in the data memory areas, in the same way that the six discs are stacked in a disc storing unit (a disc magazine) of a real disc changer.

The memory 13 is composed of a storage medium such as a hard disk or semiconductor medium etc.

Therefore, a lot of music data can be stored in a small space by using the hard disk or semiconductor medium.

In the first embodiment, the memory 13 has six data memory areas, however the number of data memory areas may be another number (it is not limited to six).

The playback unit 15 plays back the music data stored in the memory 13.

The control unit 16 is composed of a CPU (Central Processing Unit) etc. The control unit 16 controls the loading unit 11, the dubbing unit 12, the memory 13, the playback unit 14, and the display unit 15 corresponding to an operation of a user, under the condition that actions of the loading unit 11, the dubbing unit 12, the memory 13, the playback unit 14, and the display unit 15 are suitably linked to the control unit 16.

The control unit 16 has a distinguishing unit 21 which compares the disc identification numbers of the music data stored in the data memory areas 20a, 20b, 20c, 20d, 20e and 20f and the disc identification number of the disc which is loaded in the loading unit 11, and compares the quantity of used memory in each of the data memory areas 20a, 20b, 20c, 20d, 20e, and 20f and the amount of memory used on the disc which is loaded in the loading unit 11.

Specifically, the distinguishing unit 21 judges whether music data which is different from the music data recorded on the disc which is loaded in the loading unit 11, has already been stored in the selected data memory area, by judging whether the disc identification number of the music data which is stored in the selected data memory area is different from the disc identification number of the disc loaded in the loading unit 11, in the dubbing operation.

When the distinguishing unit 21 judges that different music data has been stored in the selected data memory area, a confirmation operation confirming-whether the music data recorded on the loaded disc may be overwritten on the different music data which has already been stored in the selected data memory area, is performed by using the display unit 15 (a second indication which is described later). After receiving confirmation, the control unit 16 brings the dubbing unit 12 into operation. In this operation, the dubbing unit 12 dubs (overwrites) the music data recorded in the selected data memory area with said music data on the disc which is loaded in said loading unit 11 including the track numbers of the music data and including the disc identification number.

Further, the distinguishing unit 21 judges whether the music data which has been stored in the data memory area is all of the music data recorded on the disc which is loaded in the loading unit 11, or is part of the music data recorded on the disc which is loaded in the loading unit 11, by judging whether the quantity of used memory in the data memory area is different from the amount of memory used on the disc which is loaded in the loading unit 11, in the dubbing operation.

When the distinguishing unit 21 judges that the music data which has been stored in the data memory area is part of the music data recorded on the disc which is loaded in the loading unit 11, a confirmation operation is carried out to confirm whether the remaining memory in the data memory area which has the partly stored music data, is sufficient for dubbing the rest of the music data recorded on the disc. After confirmation is obtained, the control unit 16 brings the dubbing unit 12 into operation. In this operation, the dubbing unit 12 dubs the other music data recorded on the disc which is loaded in the loading unit 11 including the other track numbers of the music data, to the data memory area which has the partly stored music data, in order of the track number.

When the distinguishing unit 21 judges that the music data which has already been stored in the data memory area is all of the music data recorded on the disc which is loaded in the loading unit 11, the control unit 16 brings the display unit 15 into operation. In this operation of the display, a confirmation image confirming that the music data recorded on the disc which is loaded in the loading unit 11 has already been stored, is indicated on the display unit 15 (a first indication which is described later).

The control unit 16 can suitably control the dubbing unit 12, the display unit 15 etc., on the basis of the effect of the discrimination by the distinguishing unit 21.

Figure 2:
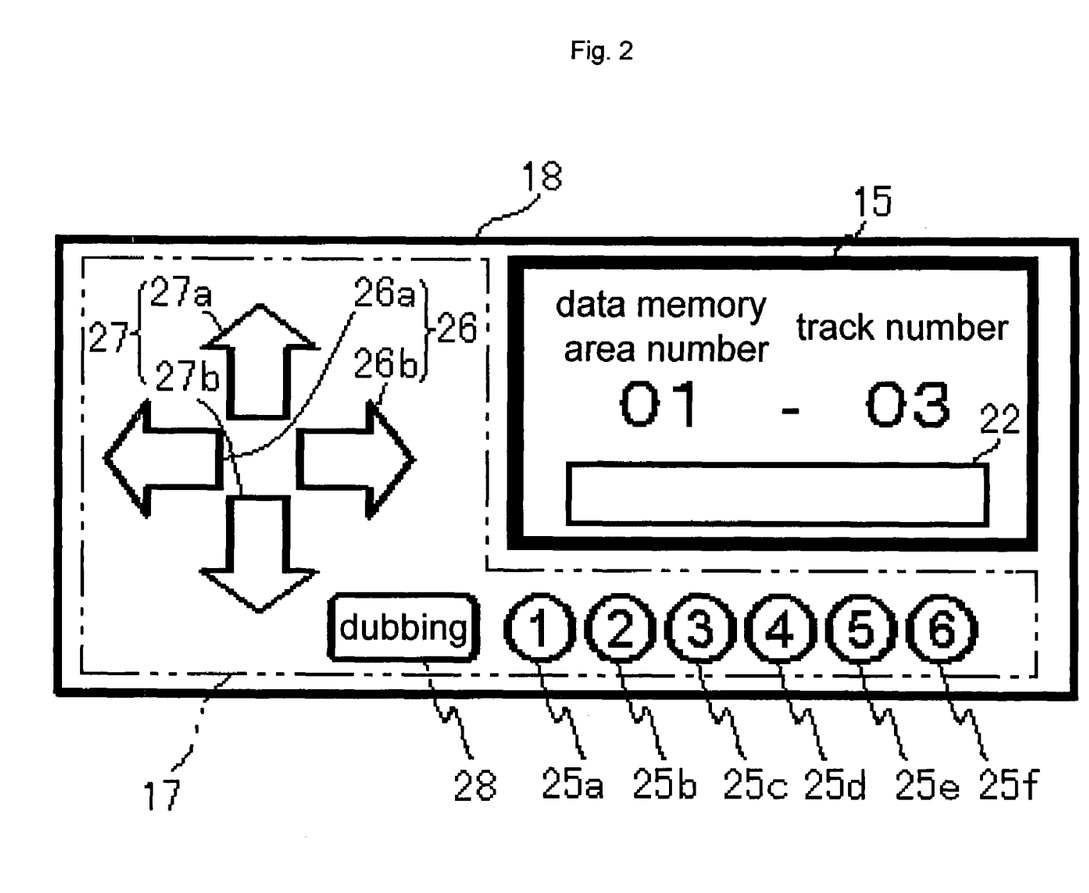
FIG. 2 is a construction diagram which shows a first front panel in the first embodiment.

The display unit 15 and the operating unit 17 are arranged on the first front panel 18 (see FIG. 2). The display unit 15 is adjacent to the operating unit 17. The display unit 15 has a first quantity display area 22 and a location display area 23.

In the first quantity display area 22, the quantity of used memory in each of the data memory areas 20a, 20b, 20c, 20d, 20e, and 20f, is indicated. The first quantity display area 22 has a first display part 24a, a second display part 24b, a third display part 24c, a fourth display part 24d, a fifth display part 24e, and a sixth display part 24f.

Figure 3:
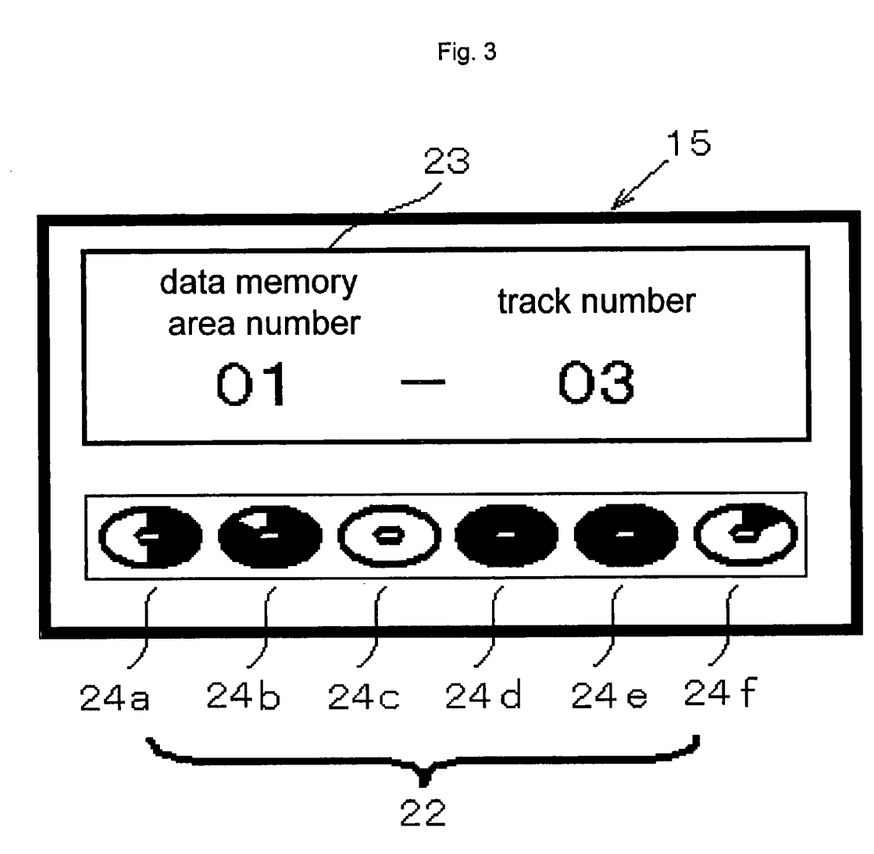
FIG. 3 is a construction diagram which shows a display unit in the first embodiment.

In the first display part 24a, a first quantity of memory used for storing music data in the first data memory area 20a, is indicated, by a graphical indication such as a pie graph (see FIG. 3).

In the second display part 24b, a second quantity of memory used for storing music data in the second data memory area 20b, is indicated, by a graphical indication such as a pie graph.

In the third display part 24c, a third quantity of memory used for storing music data in the third data memory area 20c, is indicated, by a graphical indication such as a pie graph.

In the fourth display part 24d, a fourth quantity of memory used for storing music data in the fourth data memory area 20d, is indicated, by a graphical indication such as a pie graph.

In the fifth display part 24e, a fifth quantity of memory used for storing music data in the fifth data memory area 20e, is indicated, by a graphical indication such as a pie graph.

In the sixth display part 24f, a sixth quantity of memory used for storing music data in the sixth data memory area 20f, is indicated, by a graphical indication such as a pie graph.

In the location display area 23, a location where the music data is being played back from at the present time or is stored in the memory 13 at the present time, is indicated. The location of the music data is shown by the indication of the number of the data memory area (corresponding to the disc identification number) and the track number.

Therefore, the quantity of used memory in each data memory area can be easily confirmed by using the graphical indication. Particularly, the pie graph can make the user imagine the discs 1a, 1b, 1c, 1d, 1e, and 1f, so that the quantity of memory used for storing the music data can be more easily confirmed.

The graphical indication in each of the display parts 24a, 24b, 24c, 24d, 24e, and 24f, is a ratio of the quantity of memory used for storing music data to the total quantity of memory of the music data recorded on the disc which is dubbed.

Accordingly, when all of the music data recorded on the disc which is dubbed, is stored in the selected data memory area, the display part corresponding to the selected data memory area shows 100%. When half of the music data recorded on the disc which is dubbed, is stored in the selected data memory area, the display part corresponding to the selected data memory area shows 50%.

Therefore, the quantity of the music data stored in the data memory area, can be easily confirmed.

The operating unit 17 has six direct keys 25a, 25b, 25c, 25d, 25e, and 25f, a track select-key unit 26, a data-memory-area number-select-key unit 27, and a dubbing start key 28.

The six direct keys 25a, 25b, 25c, 25d, 25e, and 25f are used for directly selecting the number of the data memory area (selecting the specific data memory area) for the six data memory areas 20a, 20b, 20c, 20d, 20e, and 20f.

When one of the six direct keys 25a, 25b, 25c, 25d, 25e, and 25f is pushed without pushing the dubbing start key 28, the data memory area corresponding to the pushed direct key is specified and the music data which is stored in this data memory area is played back. For example, when the direct key 25a is pushed by the user without pushing the dubbing start key 28, the first data memory area 20a corresponding to the pushed direct key 25a is specified and the music data which is stored in the first data memory area 20a is played back.

Therefore, the data memory area in which the music data recorded from the disc, is stored, can be instantly specified corresponding to the selected direct key.

When one of the six direct keys 25a, 25b, 25c, 25d, 25e, and 25f is pushed after the dubbing start key 28 is pushed, the data memory area corresponding to the pushed direct key is specified and the process for storing the music data, recorded on the disc which is loaded in the loading unit 11, in this data memory area, is started. For example, when the direct key 25a is pushed by the user after the dubbing start key 28 is pushed by the user, the first data memory area 20a corresponding to the pushed direct key 25a is specified and the process for storing the music data recorded on the disc which is loaded in the loading unit 11, in the first data memory area 20a, is started.

Therefore, the data memory area in which the music data is played back can be instantly specified corresponding to the selected direct key.

Therefore, the direct keys can be used to command both the dubbing operation and the playback operation, on the basis of pushing or not pushing the dubbing start key 18. Accordingly, a construction of the key arrangement can be simplified.

Each of the display parts may function in the same way as each of the direct keys. In this case, display-parts 61a, 61b, 61c, 61e, and 21f are formed by a touch panel (see FIG. 8).

Figure 8:
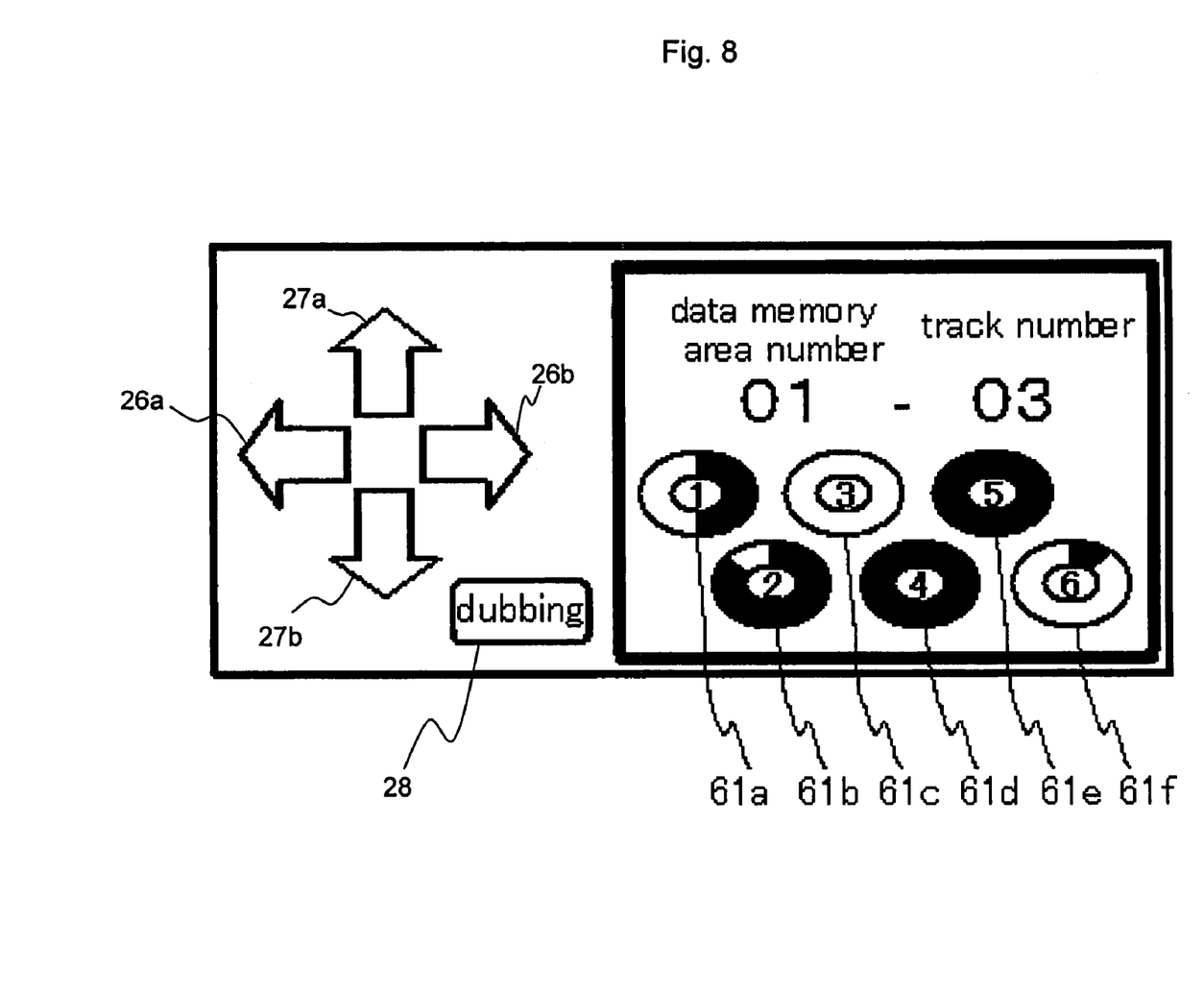
FIG. 8 is a construction diagram which shows a first front panel in the first embodiment, where each of the display parts functions in the same way as each of the direct keys.

The display-part 61a has the same functions as the first display part 24a and the direct key 25a.

The display-part 62a has the same functions at the second display part 24b and the direct key 25b.

The display-part 62c has the same functions at the third display part 24c and the direct key 25c.

The display-part 62d has the same functions at the fourth display part 24d and the direct key 25d.

The display-part 62e has the same functions at the fifth display part 24e and the direct key 25e.

The display-part 62f has the same functions at the sixth display part 24f and the direct key 25f.

The track select-key unit 26 is composed of horizontal direction keys and is used for selecting the track corresponding to the number of times the keys are pressed. The track select-key unit 26 has a track up key 26a and a track down key 26b.

When the track up key 26a is pushed one time by the user, the number of the track containing the music data which is being played back is changed by only one, in ascending order. When the track down key 26b is pushed one time by the user, the number of the track containing the music data which is being played back is changed by only one, in descending order.

Therefore, the music data (track) which is being played back can be easily changed to the next music data (track) by using the track up key 26a and the track down key 26b.

The data-memory-area number-select-key unit 27 is composed of vertical direction keys and is used for selecting the number of the data memory area corresponding to the number of times the keys are pressed. The data-memory-area number-select-key unit 27 has an up key 27a and a down key 27b.

When the up key 27a is pushed one time by the user, the number of the data memory area containing the music data which is being played back is changed by only one, in ascending order. When the down key 27b is pushed one time by the user, the number of the data memory area containing the music data which is being played back is changed by only one, in descending order.

Therefore, the data memory area of the music data which is played back can be easily changed to the next data memory area by using the up key 27a and the down key 27b.

The track select-key unit 26 and the data-memory-area number-select-key unit 27 are arranged in a cross configuration.

In the first embodiment, the track up key 26a and the track down key 26b are arranged in the horizontal direction, and the up key 27a and the down key 27b are arranged in the vertical direction. However, the track up key 26a and the track down key 26b may be arranged in the vertical direction, and the up key 27a and the down key 27b may be arranged in the horizontal direction.

Therefore, discrimination between the track select-key unit 26 and the data-memory-area number-select-key unit 27 is easy due to the cross arrangement. Particularly, the track select-key unit 26 and the data-memory-area number-select-key unit 27 can be arranged in one location, so that user-friendliness can be increased.

The location of the music data in the memory 13 can be specified by using the track up key 26a and track down key 26b for selecting the track number, and by using the up key 27a and down key 27b for selecting the number of the data memory area.

The direct key 25a corresponds to the first data memory area 20a. The direct key 25b corresponds to the second data memory area 20b. The direct key 25c corresponds to the third data memory area 20c. The direct key 25d corresponds to the fourth data memory area 20d. The direct key 25e corresponds to the fifth data memory area 20e. The direct key 25f corresponds to the sixth data memory area 20f. The data memory area can be instantly specified by using the direct keys 25a, 25b, 25c, 25d, 25e, and 25f, without pushing the up key 27a or the down key 27b several times.

The dubbing start key 28 is used for the dubbing operation where the music data recorded on the disc, which is loaded in the loading unit 11, is dubbed in the memory 13. When the dubbing start key 28 is pushed by the user, under the condition that a the disc is loaded in the loading unit 11, the process where the music data recorded on the disc, is dubbed on the memory 13, is started.

Figure 4:
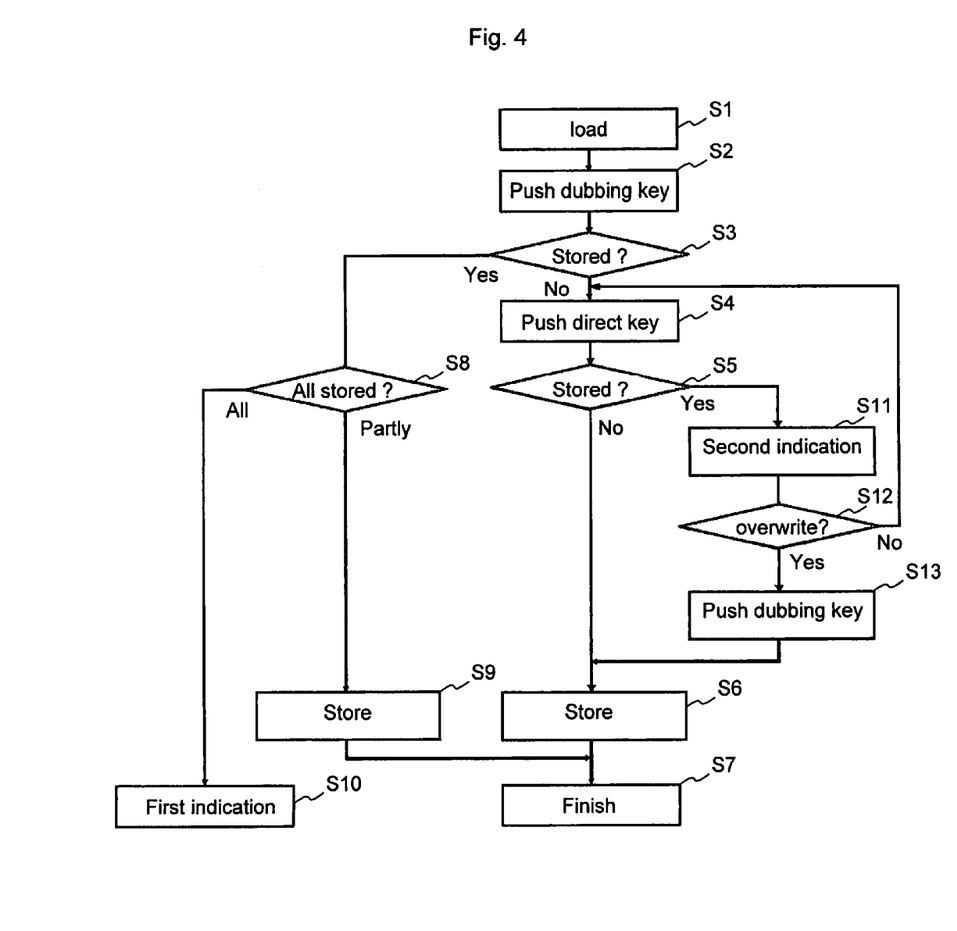
FIG. 4 is a flow chart which shows a dubbing operation in the first embodiment.

Next, the flow of the dubbing operation is described (see. FIG. 4).

In step S1, one of a first disc, second disc, third disc, fourth disc, fifth disc, and sixth disc is loaded in the loading unit 11.

In step S2, the dubbing start key 28 is pushed by the user.

In step S3, the distinguishing unit 21 judges whether the music data recorded on the disc which is loaded in the loading unit 11 has been stored in one of the data memory areas 20a, 20b, 20c, 20d, 20e, and 20f yet, by judging whether the disc identification number of the music data which is stored in one of the data memory areas is the same as the disc identification number of the disc loaded in the loading unit 11.

When the distinguishing unit 21 judges that the music data recorded on the disc has not been stored in any of the data memory areas 20a, 20b, 20c, 20d, 20e, and 20f yet (when the distinguishing unit 21 judges that the disc identification number of the music data which is stored in each of the data memory areas is different from the disc identification number of the disc loaded in the loading unit 11), the flow is forwarded to step S4.

In step S4, the data memory area is selected by pushing one of the direct keys 25a, 25b, 25c, 25d, 25e, and 25f.

In step S5, the distinguishing unit 21 judges whether the music data has been stored in the selected data memory area in step S4 yet.

When the distinguishing unit 21 judges that the music data has not been stored in the selected data memory area in step S4 yet, the flow is forwarded to step S6.

In step S6, the control unit 16 brings the dubbing unit 12 into operation. In this operation, the dubbing unit 12 dubs the music data recorded on the disc which is loaded in the loading unit 11 including the track numbers of the music data and including the disc identification number, in the selected data memory area, in compressed format, MP3 etc, in order of track number. After step S6, the flow is forwarded to step S7.

In step S7, the dubbing operation for the disc which is loaded in the loading unit 11 is finished.

When the distinguishing unit 21 judges that the music data recorded on the disc has already been stored in one of the data memory areas 20a, 20b, 20c, 20d, 20e, and 20f in step S3, the flow is forwarded to step S8.

In step S8, the distinguishing unit 21 judges whether the music data which has been stored in the data memory area is all of the music data recorded on the disc which is loaded in the loading unit 11, or is part of the music data recorded on the disc which is loaded in the loading unit 11.

When the distinguishing unit 21 judges that the music data which has been stored in the data memory area is part of the music data recorded on the disc which is loaded in the loading unit 11, the flow is forwarded to step S9.

Instep S9, the distinguishing unit 21 distinguishes the quantity of used memory in the data memory area and the remaining quantity of memory available for storing the music data in the data memory area, which has the partly stored music data.

In the case where the distinguishing unit 21 judges that the remaining quantity of memory available for storing the music data in the data memory area which stores part of the music data, is sufficient for dubbing the other music data recorded on the disc, the control unit 16 brings the dubbing unit 12 into operation.

In this operation, the dubbing unit 12 dubs the other music data recorded on the disc which is loaded in the loading unit 11 including the other track numbers of the music data, in the data memory area which has the partly stored music data, in order of track number.

Accordingly, the music data corresponding to the lowest track number of the other music data recorded on the disc, is stored first, in the data memory area which includes the partly stored the music data.

After step S9, the flow is forwarded to step S7, so that the dubbing operation for the disc which is loaded in the loading unit 11 is finished.

When the distinguishing unit 21 judges that the music data which has already been stored in the data memory area is all of the music data recorded on the disc which is loaded in the loading unit 11, the flow is forwarded to step S10.

In step S10, the control unit 16 brings the display unit 15 into operation. In this operation, a first indication indicating that the music data recorded on the disc which is loaded in the loading unit 11 has already been stored, is displayed on the display unit 15.

When the distinguishing unit 21 judges that the music data has already been stored in the selected data memory area in step S5, the flow is forwarded to step S11.

In step S11, the control unit 16 brings the display unit 15 into operation. In this operation, a second indication indicating that the music data which is different from the music data recorded on the disc which is loaded in the loading unit 11, has already been stored in the selected data memory area, is displayed. If the user would like to overwrite the music data in the selected data memory area, an option stating please push the dubbing start key 28 again, is indicated on the display unit 15, in a first time T1. In the first embodiment, the first time T1 is about 3 seconds. After step S11, the flow is forwarded to step S12.

In step S12, the distinguishing unit 21 judges whether the dubbing start key 28 is pushed again while the second indication is indicated on the display unit 15.

If the user would like to overwrite the music data in the selected data memory area, the user pushes the dubbing start key 28 again while the second indication is indicated on the display unit 15, in step S13. After step S13, the flow is forwarded to step S6.

After step S13, in step S6, the control unit 16 brings the dubbing unit 12 into operation. In this operation, the dubbing unit 12 dubs (overwrites) the music data recorded on the disc which is loaded in the loading unit 11 including the track numbers of the music data and including the disc identification number, in the selected data memory area, after being compressing, in MP3 format etc, in order of track number.

If the user would not like to overwrite the music data in the selected data memory area, the user does not push the dubbing start key 28 and waits while the second indication is indicated on the display unit 15. After the second indication is finished, the control unit 16 judges that the overwrite operation is not needed, so that the flow is moved back to step S4. After step S12, in step S4, another data memory area is selected by pushing one of the direct keys 25a, 25b, 25c, 25d, 25e, and 25f.

The selecting operation by using the direct keys 25a, 25b, 25c, 25d, 25e, and 25f in step S4 does not have to be performed by the user. In this case where the data memory area is not selected (specified), the data memory area in which the music data recorded on the disc can be stored, is automatically selected as a vacant data memory areas 20a, 20b, 20c, 20d, 20e, and 20f, by the control unit 16.

Next, the playback operation for data stored in the data memory areas is described.

First of all, the user pushes one direct key, corresponding to the data memory area which stores the music data of the music to which the user wants to listen, of the direct keys 25a, 25b, 25c, 25d, 25e, and 25f. At this time, the user needs to look at the direct keys 25a, 25b, 25c, 25d, 25e, and 25f, however the user does not have to look at the display unit 15.

After that, the control unit 16 brings the playback unit 14 into operation. In this operation, the playback unit 14 plays back the music data stored in the selected data memory area. At this time, the music data stored in the selected data memory area is played back in order of track number. Accordingly, the music data corresponding to the lowest track number stored in the selected data memory area is played back first.

If the user wants to listen to other music corresponding to the music data stored in the selected data memory area, the user suitably pushes the track up key 26a or the track down key 26b once or several times, so that the user selects the music data corresponding to the required track number.

While the music data is played back, the control unit 16 brings the display unit 15 into operation. In this operation, the display unit 15 indicates the location of the music data that is stored in the selected data memory area and that is being played back, in the location display area 23. The location of the music data is shown by the display of the number of the data memory area (corresponding to the disc identification number) and the track number.

FIG. 3 shows the location display area 23 indicating that the location of the music data being played back, is data memory area number 1 and the track number 3.

If the user wants to listen to different music corresponding to the music data stored in the different data memory areas, the user suitably pushes the direct key corresponding to the data memory area which stores the required music data, so that the playback unit 14 stops the playback operation of the music data which is being played back at the present time, and plays back the music data stored in the selected data memory area.

In this way, if the direct keys are used, the user can instantly select the data memory area which stores the music data of the music that the user wants to listen to by suitably pushing the direct key only one time, without looking at the display unit 15.

If the user wants to listen to different music corresponding to the music data stored in a higher number data memory area, the user suitably pushes the up key 27a once or several times, so that the data memory area number is changed to a higher number, one by one.

If the user wants to listen to different music corresponding to the music data stored in a lower number data memory area, the user suitably pushes the up key 27a once or several times, so that the data memory area number is changed to a lower number, one by one.

Further, in the case where the memory 13 is a medium such as a hard disk, the music data can be stored and the other music data can be played back, before the dubbing operation is finished (in step S7 of FIG. 4), so that the music data stored in the data memory area can be played back at the same time the other music data are being stored.

In the first embodiment, the graphical indications at the display parts 24a, 24b, 24c, 24d, 24e and 24f, are pie graphs. However, the graphical indication may be another graph.

Figure 5:
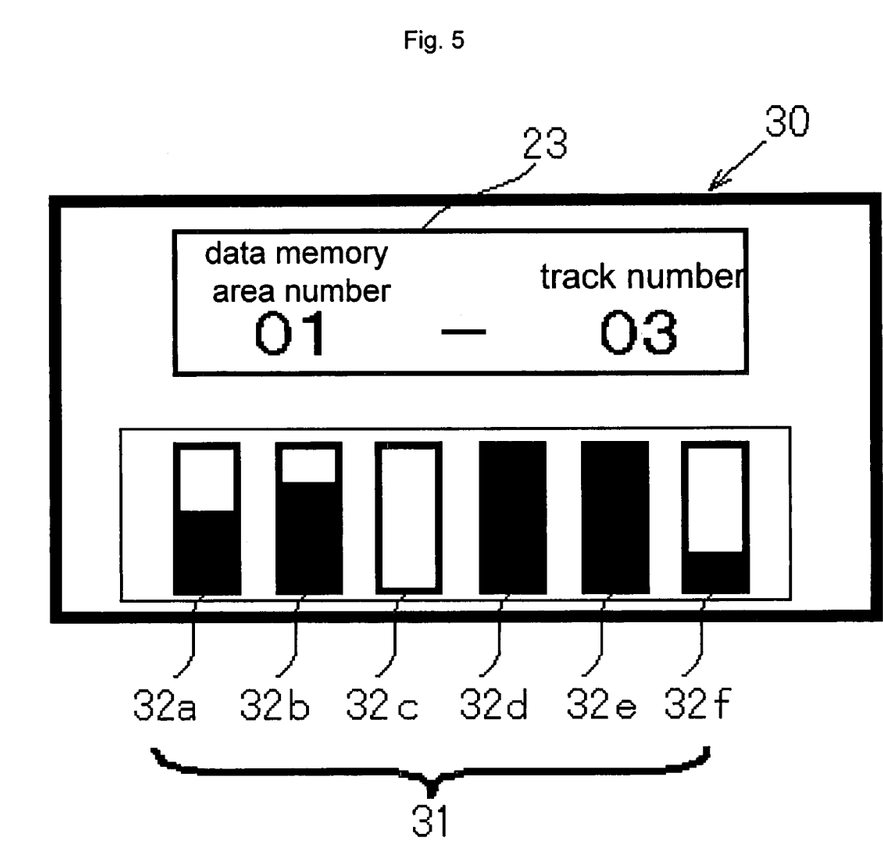
FIG. 5 is a construction diagram which shows another display unit in the first embodiment.

For example, the display unit 15 may have a second quantity display area 31 as a substitute area for the first quantity display area 22 (see FIG. 5).

In the second quantity display area 31, the quantity of used memory in each of the data memory areas 20a, 20b, 20c, 20d, 20e, and 20f is indicated. The second quantity display area 31 has a seventh display part 32a, an eighth display part 32b, a ninth display part 32c, a tenth display part 32d, an eleventh display part 32e, and a twelfth display part 32f.

In the seventh display part 32a, the first quantity of the memory used for storing music data in the first data memory area 20a, is indicated, by a graphical indication such as a bar graph.

In the eighth display part 32b, the second quantity of memory used for storing music data in the second data memory area 20b, is indicated, by a graphical indication such as a bar graph.

In the ninth display part 32c, the third quantity of memory used for storing music data in the third data memory area 20c, is indicated, by a graphical indication such as a bar graph.

In the tenth display part 32d, the fourth quantity of memory used for storing music data in the fourth data memory area 20d, is indicated, by a graphical indication such as a bar graph.

In the eleventh display part 32e, the fifth quantity of memory used for storing music data in the fifth data memory area 20e, is indicated, by a graphical indication such as a bar graph.

In the twelfth display part 32f, the sixth quantity of memory used for storing music data in the sixth data memory area 20f, is indicated, by a graphical indication such as a bar graph.

In the first embodiment, the memory 13 has six data memory areas and the operating unit 17 has six direct keys, however the number of the data memory areas and the direct keys may be another number (they are not limited to six).

Next, the second embodiment is described. In the second embodiment, the operating unit 17 which is arranged on a second front panel 40, has a shift key 41, in addition to the six direct keys 25a, 25b, 25c, 25d, 25e, and 25f, the track select-key unit 26, the data-memory-area number-select-key unit 27, and the dubbing start key 28 (see FIG. 6).

Figure 6:
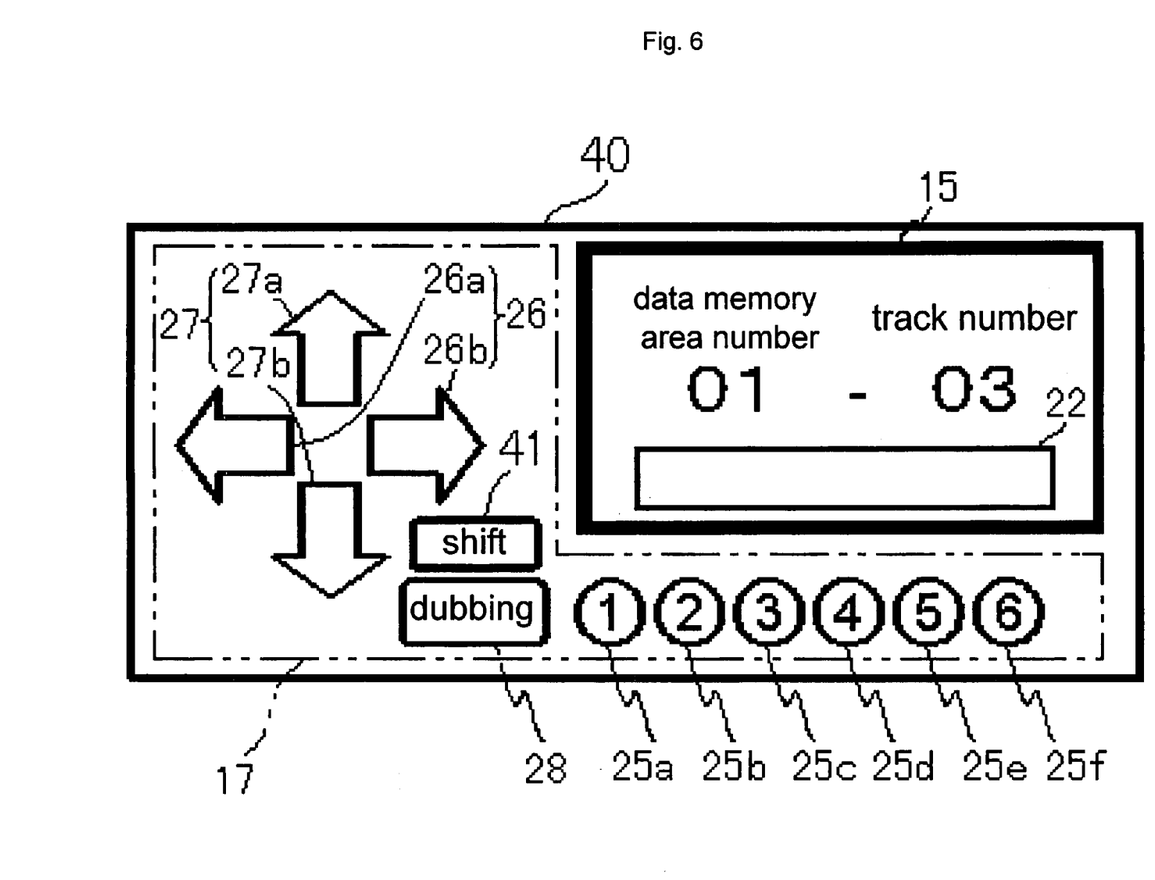
FIG. 6 is a construction diagram which shows a second front panel 40 in the second embodiment.

In the first embodiment, the memory 13 has the first data memory area 20a, the second data memory area 20b, the third data memory area 20c, the fourth data memory area 20d, the fifth data memory area 20e, and the sixth data memory area 20f.

However, in the second embodiment, the memory 13 has a seventh data memory area 42a, an eighth data memory area 42b, a ninth data memory area 42c, a tenth data memory area 42d, an eleventh data memory area 42e, a twelfth data memory area 42f, a thirteenth data memory area 42g, a fourteenth data memory area 42h, a fifteenth data memory area 42i, a sixteenth data memory area 42j, a seventeenth data memory area 42k, and an eighteenth data memory area 42l.

In the second embodiment, the six direct keys 25a, 25b, 25c, 25d, 25e, and 25f are used for directly selecting the number of the data memory area (selecting the specific data memory area) for the six data memory areas 42a, 42b, 42c, 42d, 42e, and 42f. When one of the six direct keys 25a, 25b, 25c, 25d, 25e, and 25f is pushed, the data memory area corresponding to the pushed direct key is specified and the music data which is stored in this data memory area is played back. For example, when the direct key 25a is pushed by the user, the seventh data memory area 42a corresponding to the pushed direct key 25a is specified and the music data which is stored in the seventh data memory area 42a is played back.

Further, in the second embodiment, the six direct keys 25a, 25b, 25c, 25d, 25e, and 25f and the shift key 41 are used for semi-directly selecting the number of the data memory area (the specific data memory area) for the six data memory areas 42g, 42h, 42i, 42j, 42k, and 42l. When the shift key 41 and one of the six direct keys 25a, 25b, 25c, 25d, 25e, and 25f are pushed at the same time, the data memory area corresponding to the pushed direct key is specified and the music data which is stored in this data memory area is played back. For example, when the shift key 41 and the direct key 25a are pushed by the user at the same time, the thirteenth data memory area 42g corresponding to the pushed direct key 25a is specified and the music data which is stored in the thirteenth data memory area 42g is played back.

The other constructions of the body 10 in the second embodiment are the same as those in the first embodiment.

In the second embodiment, the music data recorded on twelve discs can be stored in twelve data memory areas 42a to 42l, and the music data stored in twelve data memory areas 42a to 42l can be played back, without adding more direct keys.

Next, the third embodiment is described. In the third embodiment, the operating unit 17 which is arranged on a third front panel 50, has the six direct keys 25a, 25b, 25c, 25d, 25e, and 25f, the track select-key unit 26, and the data-memory-area number-select-key unit 27, without the dubbing start key 28 (see FIG. 7).

Figure 7:
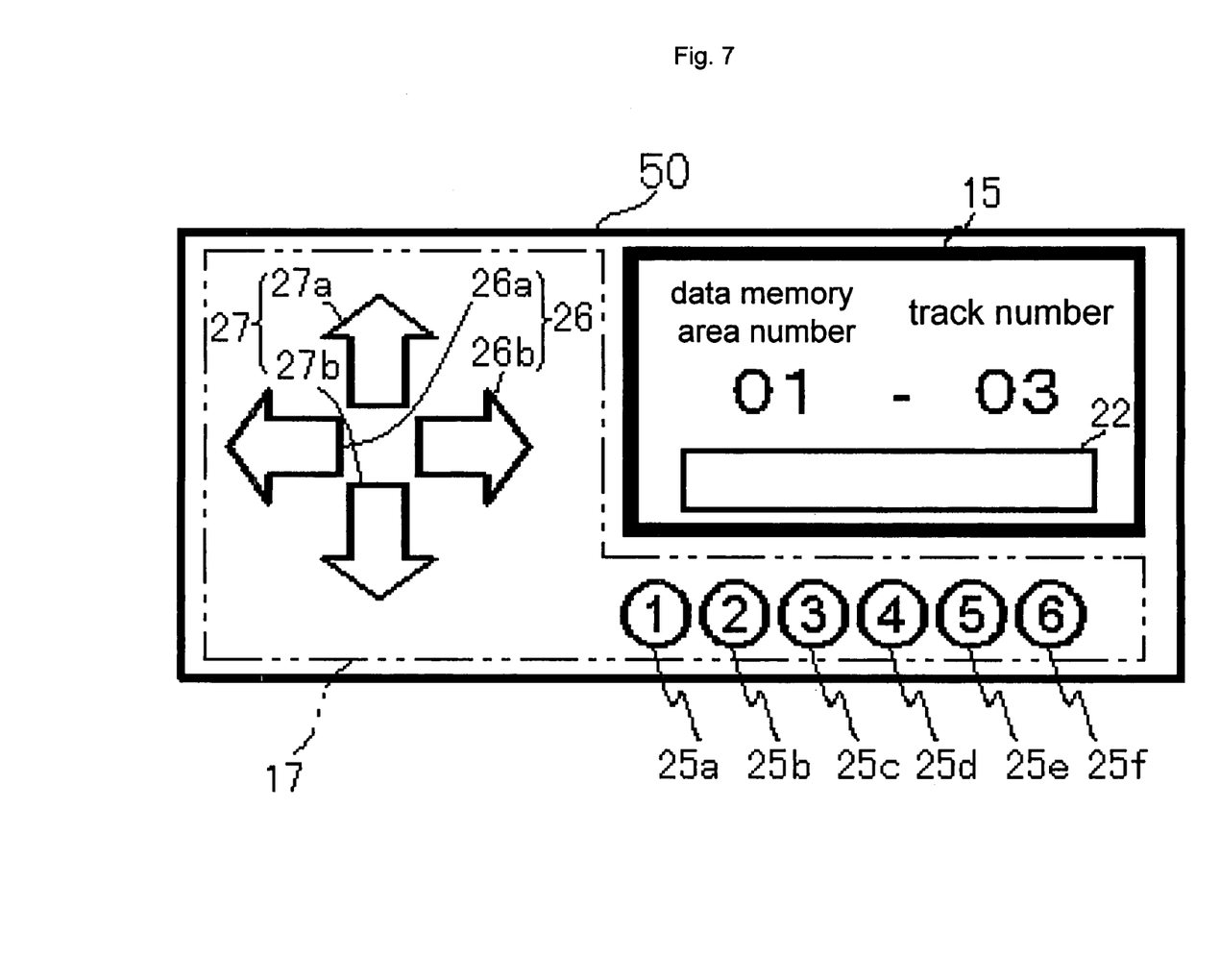
FIG. 7 is a construction diagram which shows a third front panel 50 in the third embodiment.

In the first embodiment, when the dubbing start key 28 is pushed by the user, the dubbing operation is started. However, in the third embodiment, when one of the six direct keys 25a to 25f is long-pushed (pushed for a long time) by the user, the dubbing operation is started. When one of the six direct keys 25a to 25f is short-pushed (pushed for a short time) by the user, the music data stored in the selected data memory area corresponding to the short-pushed direct key is played back, in a similar manner to that of the first embodiment.

The distinguishing unit 21 judges that it is long-pushed when the continuous pushing time is longer than a second time T2, and that it is short-pushed when the continuous pushing time is not longer than the second time T2. It is desirable that the second time T2 is set from 1 second to 2 seconds, however it is not limited.

In the third embodiment, the dubbing start key is omitted, so that the design of the third front panel 50 can be more simplified.

In the third embodiment, discrimination between a selection of the dubbing operation and a selection of the playback is performed by distinguishing a length of the continuous pushing time. However, the discrimination can be performed by distinguishing a pushing quantity of the direct key. For example, when one of the six direct keys 25a to 25f is deep-pushed (pushed for a longer distance) by the user, the dubbing operation is started. When one of the six direct keys 25a to 25f is shallow-pushed (pushed for a shorter distance) by the user, the music data stored in the selected data memory area corresponding to the shallow-pushed direct key is played back.

Therefore, the direct keys can be used both for the dubbing operation and the playback operation, on the basis of the discrimination between a long-push and short-push (or a deep-push and shallow-push). Accordingly, a construction of the key arrangement can be simplified.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2005-110662 (filed on Apr. 7, 2005) and 2005-368175 (filed on Dec. 21, 2005), which are expressly incorporated herein by reference, in their entirety.

The invention claimed is:

1. An audio player, comprising:
a loading unit that loads a disc;
a memory that has a plurality of data memory areas;
an operating unit that has direct keys for selecting the specific data memory area in said plurality of data memory areas;
a dubbing unit that dubs sound data recorded on said disc with a proper disc identification number which said disc has, into said data memory area selected by said direct key;
a playback unit that plays back said sound data stored in said selected memory area;
a display unit that has a quantity display area having a plurality of display parts and a location display area, a quantity of memory used for storing said sound data in each of said data memory areas being indicated in each of said display parts, a location where said sound data is being played back from or is stored in said memory, being indicated in said location display area; and
a control unit that controls said loading unit, said dubbing unit, said memory, said playback unit, and said display unit.

2. The audio player according to claim 1, wherein said sound data recorded on said disc, is stored in said memory, in a compressed condition.

3. The audio player according to claim 1, wherein said memory is a hard disk or a semiconductor medium.

4. The audio player according to claim 1, wherein said operating unit has a dubbing start key;
when one of said direct keys is pushed without operating said dubbing start key, a data memory area corresponding to said pushed direct key is specified and sound data which is stored in said specified data memory area, is played back; and when one of said direct keys is pushed after said dubbing start key is operated, a data memory area corresponding to said pushed direct key is specified and sound data recorded on said disc which is loaded in said loading unit, is stored in said specified data memory area.

5. The audio player according to claim 1, wherein discrimination between a selection of the dubbing operation and a selection of the playback operation is performed by distinguishing a length of continuous operating time of one of said direct keys.

6. The audio player according to claim 1, wherein said operating unit has a data-memory-area number-select-key unit;

said data-memory-area number-select-key unit has an up key which is used for selecting a number of said data memory area, in ascending order, and has a down key which is used for selecting said number of said data memory area, in descending order.

7. The audio player according to claim 1, wherein said sound data is zoned into tracks of said disc;

said operating unit has a track select-key unit; and said track select-key unit has a track up key which is used for selecting a track of said sound data stored in said memory, in ascending order, and has a track down key which is used for selecting a track of said sound data stored in said memory, in descending order.

8. The audio player according to claim 7, wherein said operating unit has a data-memory-area number-select-key unit;

said data-memory-area number-select-key unit has an up key which is used for selecting a number of said data memory area, in ascending order, and has a down key which is used for selecting said number of said data memory area, in descending order;

said track select-key unit and said data-memory-area number-select-key unit are arranged in a cross;

one of said track select-key unit and said data-memory-area number-select-key unit is arranged in a horizontal direction; and another of said track select-key unit and said data-memory-area number-select-key unit is arranged in a vertical direction.

9. The audio player according to claim 1, wherein said control unit has a distinguishing unit which compares said disc identification number of sound data which is stored in said data memory area and said disc identification number of said disc loaded in said loading unit, and compares the quantity of used memory in each of said data memory areas and the amount of memory used on in said disc loaded in said loading unit.

10. The audio player according to claim 9, wherein said distinguishing unit judges whether the disc identification number of the sound data which is stored in one of said data memory areas is the same as said disc identification number of said disc loaded in said loading unit; wherein, when the disc identification number of the sound data which is stored in each of said data memory areas is different from said disc identification number of said disc loaded in said loading unit, and when sound data has already been stored in said selected data memory area, said control unit brings said dubbing unit into operation; and in said operation, said dubbing unit overwrites said sound data recorded in said selected data memory area with said sound data recorded on said disc which is loaded in said loading unit.

11. The audio player according to claim 9, wherein said distinguishing unit judges whether sound data has already been stored in said selected data memory area, and judges whether said disc identification number of sound data which is stored in said selected data memory area is the same as said disc identification number of said disc loaded in said loading unit, and judges whether sound data which has been stored in said selected data memory area is all of said sound data recorded on said disc which is loaded in said loading unit; wherein, when sound data has already been stored in said selected data memory area, and said disc identification number of sound data which is stored in said selected data memory area is the same as said disc identification number of said disc loaded in said loading unit, and sound data which has been stored in said selected data memory area is all of said sound data recorded on said disc which is loaded in said loading unit, said control unit brings said display unit into operation; and in said operation, an indication that said sound data recorded on said disc which is loaded in said loading unit has already been stored, is indicated on said display unit.

12. The audio player according to claim 9, wherein said distinguishing unit judges whether sound data has already been stored in said selected data memory area, and judges whether said disc identification number of sound data which is stored in said selected data memory area is the same as said disc identification number of said disc loaded in said loading unit, and judges whether sound data which has been stored in said selected data memory area is part of said sound data recorded on said disc which is loaded in said loading unit;

when sound data has already been stored in said selected data memory area, and said disc identification number of sound data which is stored in said selected data memory area is the same as said disc identification number of said disc loaded in said loading unit, and sound data which has been stored in said selected data memory area is part of said sound data recorded on said disc which is loaded in said loading unit, said control unit brings said dubbing unit into operation; and in said operation, said dubbing unit dubs the other sound data recorded on said disc which is loaded in said loading unit, in said data memory area which has the partly stored said sound data, in order of track number.

13. The audio player according to claim 1, wherein in each of said display parts, said quantity of memory used for storing said sound data in each of said data memory areas is indicated by a graphical indication.

14. The audio player according to claim 13, wherein said graphical indication is a pie graph.

15. The audio player according to claim 13, wherein said graphical indication in each of said display parts is a ratio of said quantity of memory used for storing said sound data, to the total quantity of sound data recorded on the disc which is dubbed.

16. The audio player according to claim 1, wherein each of said plurality of display parts functions in the same way as each of said direct keys.

* * * * *